United States Patent
Eriksson et al.

(10) Patent No.: US 12,054,180 B2
(45) Date of Patent: Aug. 6, 2024

(54) METHOD FOR TRANSITIONING A DRIVE MODE OF A VEHICLE, DRIVE CONTROL SYSTEM FOR A VEHICLE AND VEHICLE

(71) Applicant: Volvo Car Corporation, Gothenburg (SE)

(72) Inventors: Alexander Eriksson, Gothenburg (SE); Rasmus Andersson, Gothenburg (SE); Paolo Volpi Perinciolo, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 125 days.

(21) Appl. No.: 17/589,924

(22) Filed: Feb. 1, 2022

(65) Prior Publication Data
US 2022/0281483 A1 Sep. 8, 2022

(30) Foreign Application Priority Data
Mar. 4, 2021 (EP) .................................... 21160800

(51) Int. Cl.
*B60W 60/00* (2020.01)
*B60W 30/09* (2012.01)
(Continued)

(52) U.S. Cl.
CPC ........ *B60W 60/0051* (2020.02); *B60W 30/09* (2013.01); *B60W 30/12* (2013.01);
(Continued)

(58) Field of Classification Search
CPC ...... B60W 60/00; B60W 30/00; B60W 50/00; B60W 2050/00
See application file for complete search history.

(56) References Cited

U.S. PATENT DOCUMENTS

| 2015/0006028 A1 | 1/2015 | Strauss | |
|---|---|---|---|
| 2018/0239352 A1* | 8/2018 | Wang | ................ B60W 60/0051 |

(Continued)

FOREIGN PATENT DOCUMENTS

| DE | 102011085167 A1 | 4/2013 |
|---|---|---|
| WO | 2019088893 A1 | 5/2019 |
| WO | 2020181420 A1 | 9/2020 |

OTHER PUBLICATIONS

Wimmer, Translation of WO 2013/117309 A1, Aug. 15, 2013 (Year: 2013).*

(Continued)

*Primary Examiner* — Aniss Chad
*Assistant Examiner* — Elizabeth J Slowik
(74) *Attorney, Agent, or Firm* — Clements Bernard Walker; Christopher L. Bernard; Devin Cummins

(57) ABSTRACT

A method for transitioning a drive mode of a vehicle from an assisted drive mode (AS) to an automated drive mode (AD), the method including: providing an assisted drive mode (AS) configured to support a driver controlling the vehicle at a medium support level; receiving an activation request for activating an automated drive mode (AD) configured to control a driving of the vehicle autonomously; reducing a support level (SL) to a safe assisted drive mode (ADAS) configured to support the driver at a low support level, the reduction of the SL from the AS to the ADAS including a first kinematic feedback; and if the activation request is successful, increasing the SL from the ADAS to the AD, the increase of the SL from the ADAS to the AD including a second kinematic feedback to the driver; or if the activation request fails, maintaining the ADAS.

20 Claims, 2 Drawing Sheets

(51) Int. Cl.
*B60W 30/12* (2020.01)
*B60W 30/14* (2006.01)
*B60W 50/14* (2020.01)
*B60W 50/16* (2020.01)

(52) U.S. Cl.
CPC ............ *B60W 30/14* (2013.01); *B60W 50/16* (2013.01); *B60W 60/0061* (2020.02); *B60W 2050/143* (2013.01); *B60W 2050/146* (2013.01)

(56) References Cited

U.S. PATENT DOCUMENTS

| | | | |
|---|---|---|---|
| 2018/0364709 A1 | 12/2018 | Choi et al. | |
| 2019/0092389 A1* | 3/2019 | McGill | B60T 8/17 |
| 2019/0146489 A1* | 5/2019 | Zaizen | B60W 60/0053 |
| | | | 701/42 |
| 2020/0139992 A1* | 5/2020 | Oba | G08G 1/16 |
| 2020/0262441 A1* | 8/2020 | Kuwahara | B60W 30/182 |
| 2020/0290646 A1* | 9/2020 | Safour | B60W 50/14 |
| 2020/0307691 A1* | 10/2020 | Kalabic | B62D 15/025 |
| 2021/0339774 A1* | 11/2021 | Kim | B60W 50/14 |
| 2022/0126878 A1* | 4/2022 | Moustafa | G08G 1/09675 |
| 2022/0204045 A1* | 6/2022 | Yamasaki | B60W 60/0053 |
| 2022/0219688 A1* | 7/2022 | Ito | G08G 1/167 |
| 2022/0266869 A1* | 8/2022 | Ito | B60W 60/0053 |

OTHER PUBLICATIONS

Jul. 27, 2021 Partial European Search Report issued on International Appl. No. 21160800.

* cited by examiner

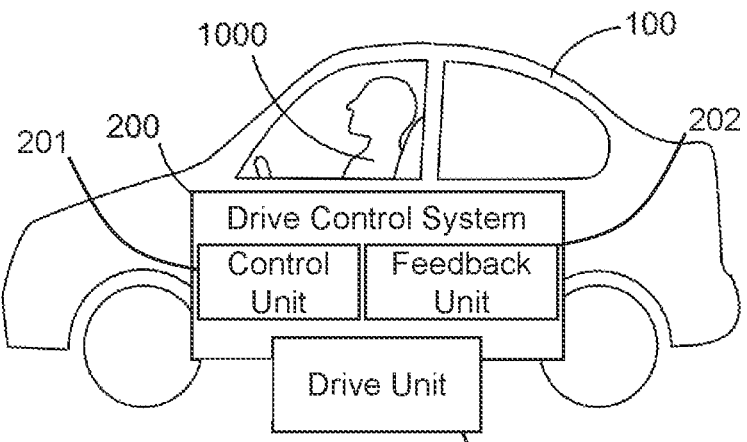
Fig. 1
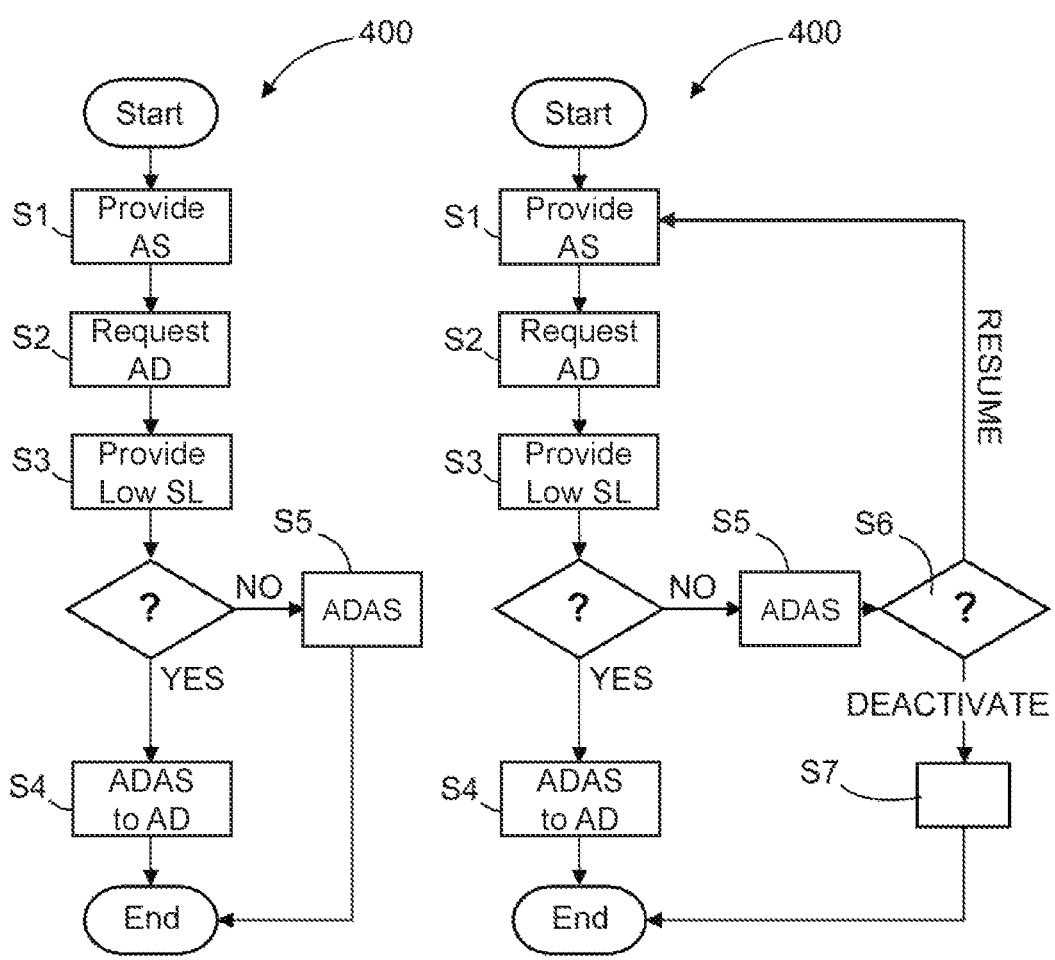
Fig. 2
Fig. 3

METHOD FOR TRANSITIONING A DRIVE MODE OF A VEHICLE, DRIVE CONTROL SYSTEM FOR A VEHICLE AND VEHICLE

CROSS-REFERENCE TO RELATED APPLICATION

The present disclosure claims the benefit of priority of co-pending European Patent Application No. 211 608 00.5, filed on Mar. 4, 2021, and entitled "METHOD FOR TRANSITIONING A DRIVE MODE OF A VEHICLE, DRIVE CONTROL SYSTEM FOR VEHICLE AND VEHICLE," the contents of which are incorporated in full by reference herein.

TECHNICAL FIELD

The present disclosure relates to a method for transitioning a drive mode of a vehicle from an assisted drive mode to an automated drive mode, a drive control system for a vehicle and a vehicle.

BACKGROUND

Vehicles being equipped with automated drive mode are getting more common. The automated drive mode usually is one of various drive modes a driver of the vehicle can select and/or can selectively switch between different drive modes. Thus, there are known different methods for informing the driver of the current activated drive mode.

One example of a known method for controlling a drive mode of an autonomous driving vehicle may include comparing a current vehicle speed with a predefined reference vehicle speed when a driving mode change signal is generated during driving of the autonomous driving vehicle in manual driving mode. The exemplary method further includes stopping the manual driving mode and executing autonomous driving mode when a result of the comparison indicated that the current vehicle speed is equal to or slower than the predefined reference vehicle speed; and executing the autonomous driving mode or maintaining the manual driving mode which is a current driving mode, depending on a determination result of whether an APS signal is generated or not, when the result of the comparison indicates that current vehicle speed exceeds the reference vehicle speed.

SUMMARY

There may, therefore, be a need to provide an alternative method for transitioning a drive mode and drive control system for a vehicle, particularly a method and/or system providing feedback with an improved perceptibility to the driver.

The object of the present disclosure is solved by the subject matter of the appended independent claims, wherein further embodiments are incorporated in the dependent claims.

According to a first aspect, there is provided a method for transitioning a drive mode of a vehicle from an assisted drive mode to an automated drive mode. The method includes the following steps: providing an assisted drive mode configured to support a driver controlling the vehicle at a medium support level; receiving an activation request for activating an automated drive mode configured to control a driving of the vehicle autonomously; and reducing a support level to a safe assisted drive mode configured to support the driver at a low support level. The reduction of the support level from the assisted drive mode to the safe assisted drive mode includes a first kinematic feedback. If the activation request is successful, the method further includes the step of increasing the support level from the safe assisted drive mode to the automated drive mode. The increase of the support level from the safe assisted drive mode to the automated drive mode includes a second kinematic feedback to the driver. Alternatively, if the activation request fails, the method further includes the step of maintaining the safe assisted drive mode.

An activation request is made by a driver of the vehicle, and may correspond to a signal, which may be triggered by an input of the driver, e.g. the driver pressing a button. A transition from any drive mode to the automated drive mode corresponds to a transfer of the driving responsibility from the driver to the vehicle, particularly to a drive control system of the vehicle. It is therefore of particular importance that both a successful and an unsuccessful mode transition are clearly perceptible to the driver. A transition from the assisted drive mode to the automated drive mode is of particular importance, because these two modes have most of the driving control characteristics in common but entail fundamental differences in responsibility of the driving.

The method further reduces or prevents mode confusion during and/or after an attempted transition from the assisted mode to the automated mode, and further reduces the risk of a driver's over-reliance on traditional information devices, such as visual, haptic or audio feedback warning only. Thus, a risk of harm due to warnings not being perceived by the driver in all driving situations, is reduced or eliminated. The first and second kinematic feedback are directly related to the main driving controls and thereby educate the driver to feel the mode change. Consequently, the method unequivocally informs the driver of either a successful mode transition (first feedback followed by second feedback) or unsuccessful mode transition (first feedback only).

In other words, one can say that the method relies on the user's previous experience of conventional or manual driving to state if the user or the vehicle is currently in charge of guaranteeing safety of driving, rather than employing dedicated means of communication that might be misused and/or ignored by an experienced driver or might be not understood by an unexperienced driver. Therefore, the method reduces the likelihood of the occurrence of a faulty behavior leading to harmful outcome and provides a sufficient safety to fulfil the demanding safety requirements for the transition. The method may be at least partly computer-implemented, and may be implemented in software and/or in hardware. For example, the method may be performed by a control unit being included in a drive control system or a vehicle control system of the vehicle.

According to an embodiment, the medium support level may include a longitudinal and lateral control, preferably provided by an activated lane centering assist and an activated adaptive cruise control.

The medium support level being provided in the assisted drive mode is configured to assist the driver during driving. This means that the driver is still responsible for driving the vehicle, but the assisted drive mode may share or take over the control of some of the driving requirements, such as keeping the vehicle centered in lane, maintaining a vehicle speed, keeping a predefined distance to a vehicle in front by adapting the vehicle speed and the like.

According to an embodiment, the low support level may include a longitudinal braking assistance and active safety functionalities, preferably provided by an activated lane keeping assist and an activated collision prevention assist, and/or an activated deceleration function to maintain a distance from the vehicle ahead.

The low support level being provided in the safe assisted drive mode is configured to only minimally assist the driver during driving. This means that the driver is responsible for driving the vehicle and the safe assisted drive mode only provides basic assistance in order to prevent collisions. Thus, the low support level only provides assistance when it is detected that a collision might occur, such as keeping the vehicle in lane when the vehicle comes close to lane boundaries, decelerating the vehicle when a distance to a vehicle ahead is detected to become smaller and/or actively braking to prevent a collision with a vehicle and/or obstacle ahead, and the like.

According to an embodiment, the first and the second kinematic feedback may be based on a main driving control. According to an embodiment, the first kinematic feedback may be characterized by a slackening of the main driving control.

The slackening of the main driving control may include stopping to assist maintaining the vehicle speed and/or stopping to assist keeping the vehicle centered in lane. In case, the activation of the automated drive mode fails, the driver may then for example, recognize that the vehicle is getting slower, and by this, perceiving that the transition to the automated drive mode has not been successful. Further, the driver may recognize less resistance against turning a steering wheel, and automatically knows that the assisted drive mode is deactivated. In case, the activation of the automated drive mode fails, the slackening of the main driving controls may still provide a minimum of assistance during mainly manual control to prevent collisions and/or provide traditional active safety functionalities being actuated in case of potential and/or imminent danger.

According to an embodiment, the second kinematic feedback may be characterized by a sharpening of the main driving control. The sharpening of the main driving control may include starting to assist maintaining the vehicle speed and/or starting to assist keeping the vehicle centered in lane. The driver then, for example, recognizes that the acceleration control by the vehicle is resumed, e.g. by perceiving that the engine braking ceases, and/or the accelerator pedal does not respond any more to pressing. Further, the driver may recognize that the steering wheel resists manual turning, and automatically knows that the request for activating the automated drive mode has been successful and the automated drive mode is activated. The sharpening of the main driving controls may include a sharp activation of tight, confident longitudinal and lateral controls. The sharpening may include longitudinal and lateral control that are tighter than the longitudinal and lateral control during the assisted drive mode, if the specific control is available in both, the assisted and the automated drive mode.

According to an embodiment, the main driving control may include an accelerator control method, a brake control method and/or a steering control method.

The accelerator control method may include any means to accelerate the vehicle, such as an accelerator pedal, a joystick, a button, and the like. The braking control method may include any means to decelerate the vehicle and/or braking, such as a brake pedal, a joystick, a button, and the like. The steering control method may include any means to steer the vehicle, such as a steering wheel, a joystick, buttons, and the like.

According to an embodiment, the method may additionally provide an acoustic and/or a visual and/or a haptic feedback configured to indicate the activated drive mode.

A combination of the first and second kinematic feedback with traditional information devices, such as an acoustic, visual and/or haptic feedback may train the driver to detect and promptly react to potential faulty behavior.

According to an embodiment, the safe assisted drive mode may be maintained for a predefined amount of time, or until receiving an interaction request of the driver.

If the predefined amount of time has elapsed, the safe assisted drive mode may be deactivated automatically and the drive mode may be switched to a manual drive mode providing only minimal support. Minimal support may include basic safety functionalities only.

According to an embodiment, the interaction request of the driver may request resuming the assisted drive mode or may request transitioning to a manual drive mode configured to not assisting the driver but to provide basic safety functionalities.

According to a second aspect, there is provided a drive control system for a vehicle. The drive control system includes a control unit and a feedback unit. The control unit is configured to provide an assisted drive mode configured to support a driver controlling the vehicle at a medium support level; to receive an activation request for activating an automated drive mode configured to control a driving of the vehicle autonomously; to reduce the support level to a safe assisted drive mode configured to support the driver at a low support level; and if the activation request is successful, increase the support level from the safe assisted drive mode to an automated drive mode, or if the activation request fails, maintain the safe assisted drive mode. The feedback unit is configured to provide a first kinematic feedback to the driver when reducing the support level from the assist drive mode to the safe assist drive mode and/or to provide a second kinematic feedback to the driver when increasing the support level from the safe assisted drive mode to the automated drive mode.

The first and second kinematic feedback are directly related to the main driving controls and thereby educates the driver to feel the mode change. Consequently, the driver is unequivocally informed of either a successful mode transition (second feedback) or unsuccessful mode transition (first feedback). Thus, the driving control system prevents mode confusion during and/or after an attempted transition from the assisted mode to the automated mode, and further reduces the risk of a driver's over-reliance on traditional information devices, such as visual, haptic or audio feedback or warning only. Further, a risk of failure due to warnings not being perceived by the driver in all driving situations, is reduced or eliminated.

According to an embodiment, the control unit may further include a manual drive mode configured to not assisting the driver but to provide basic safety functionalities.

According to an embodiment, the drive control system may additionally include human-machine-interface configured to provide an acoustic and/or a visual and/or a haptic feedback indicating the actual/activated drive mode.

According to an embodiment, the first and the second kinematic feedback may be based on a main driving control.

According to a third aspect, there is provided a vehicle, including a drive control system according to the second aspect and a drive unit configured to control a motion of the vehicle, wherein the drive control system is configured to control the drive unit.

These and other aspects of present disclosure will become apparent from and elucidated with reference to embodiments described hereinafter.

BRIEF DESCRIPTION OF THE DRAWINGS

Exemplary embodiments of the disclosure will be described in the following with reference to the following drawings.

FIG. 1 shows a schematic view of an exemplary embodiment of a vehicle including a drive control system and a drive unit.

FIG. 2 shows a flowchart, schematically illustrating an exemplary embodiment of a method for transitioning a drive mode of a vehicle from an assisted drive mode to an automated drive mode.

FIG. 3 shows a flowchart, schematically illustrating another embodiment of a method for transitioning a drive mode of a vehicle from assisted drive mode to an automated drive mode.

Figure 4:
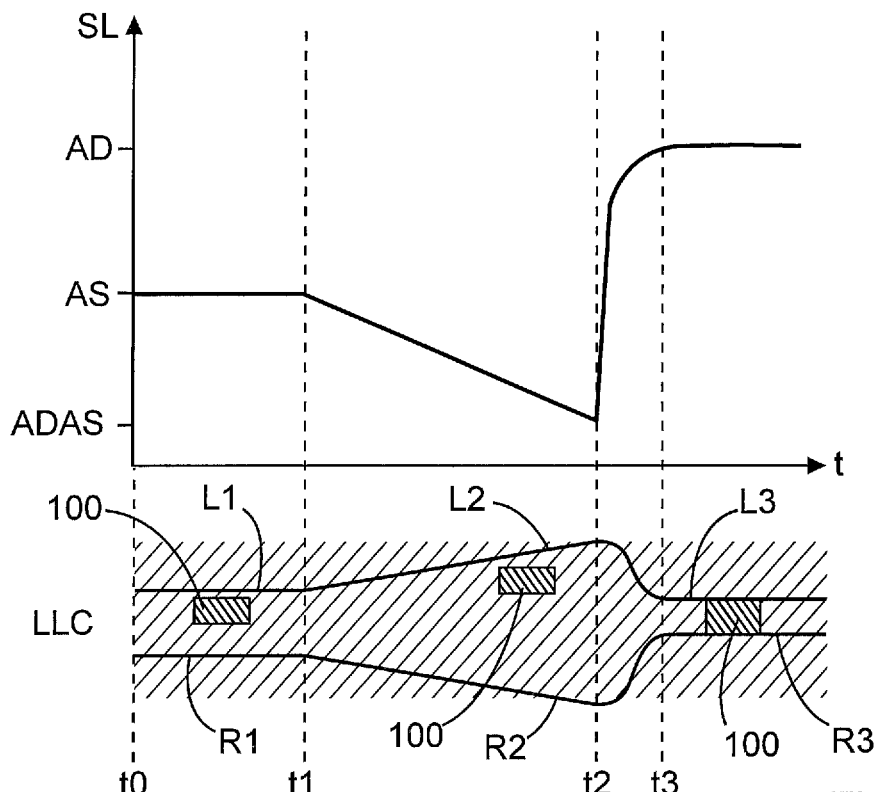
FIG. 4 shows a diagram, schematically illustrating the process of transitioning a drive mode of a vehicle from assisted drive mode to an automated drive mode, in case the activation request for activating the automated drive mode being successful, over time as well as the corresponding changes in the support level by the example of lateral lane control.

The figures are merely schematic representations and serve only to illustrate embodiments of the disclosure. Identical or equivalent elements are in principle provided with the same reference signs.

DETAILED DESCRIPTION

FIG. 1 shows a schematic view of an exemplary embodiment of a vehicle 100 including a drive control system 200 and a drive unit 300. The drive control system 200 includes a control unit 201 and a feedback unit 202. The control unit 201 is configured to provide different drive modes to a driver 1000, the feedback unit 202 is configured to provide kinematic feedbacks to the driver 1000, and the drive control system 200 is configured to control the drive unit 300. The drive unit 300 is configured to control a motion of the vehicle 100.

FIG. 2 shows an exemplary embodiment of a method 400 for transitioning a drive mode of the vehicle 100 from an assisted drive mode to an automated drive mode. The method 400 includes a step S1 of providing an assisted drive mode AS configured to support the driver 1000 controlling the vehicle 100 at a medium support level. The medium support level corresponds to a support level SL controlling some of the driving actions of the driver 1000, e.g. a longitudinal and lateral control, preferably provided by an activated lane centering assist and an activated adaptive cruise control, but the driver 1000 still is responsible for driving the vehicle 100. The assisted drive mode AS may also referred to as partly automated drive mode.

A step S2 includes receiving an activation request for activating an automated drive mode AD, the activation request being sent by the driver 1000, e.g. by pressing a button, when the driver 1000 wants to switch to the automated drive mode AD. The automated drive mode AD is configured to control a driving of the vehicle 100 autonomously, that is, the vehicle 100, in particular the drive control system 200 is responsible for driving the vehicle 100. Thus, the automated drive mode AD may also be referred to as fully automated drive mode and, therefore, is configured to provide a high—or full—support level.

As soon as the activation request for activating the automated drive mode AD has been initiated by the driver, the support level SL is reduced to a safe assisted drive mode ADAS, which is configured to support the driver 1000 at a low support level (step S3). The low support level corresponds to a support level SL controlling only a minimum of the driving actions for ensuring a basic safety level of the vehicle 100. The low support level includes a longitudinal braking assistance and active safety functionalities, e.g. provided by an activated lane keeping assist and an activated collision prevention assist, which will actuate the vehicle 100 only in case of potential or imminent danger. The reduction of the support level SL from the assisted drive mode AS to the safe assisted drive mode ADAS includes a first kinematic feedback being characterized by a slackening of at least one main driving control. Thus, the first kinematic feedback is perceivable by the driver 1000, e.g. by feeling a reduced stiffness of a steering wheel against turning and ensures that the driver 1000 is aware of the fact that he is in charge of guaranteeing the safety of driving.

If the activation request is successful (YES in FIG. 2), the support level SL is increased from the safe assisted drive mode ADAS to the automated drive mode AD (step S4). The increase of the support level SL from the safe assisted drive mode ADAS to the automated drive mode AD includes a second kinematic feedback to the driver 1000 being characterized by a sharpening of at least one main driving control. Thus, the second kinematic feedback is perceivable by the driver 1000, e.g. by feeling an increased stiffness of the steering wheel against turning, preferably such that the steering wheel is difficult to control by the driver 1000. Thus, the second kinematic feedback in combination with the preceding first feedback, signals the driver 1000 that now the vehicle 100 itself is in charge of being responsible for controlling the driving of the vehicle 100.

If the activation request fails (NO in FIG. 2), the safe assisted drive mode ADAS is maintained (step S5). As no other feedback is provided to the driver 1000, the driver 1000 still knows that he is in charge of controlling the vehicle 100.

FIG. 3 shows another embodiment of the method 400 for transitioning a drive mode of a vehicle from assisted drive mode AS to an automated drive mode AD including the steps S1 to S5 as described with regard to FIG. 2 and additionally including further steps in case of failure of the activation request. For sake of brevity, repeating the description of the steps S1 to S5 is omitted. In case that the activation request failed, the safe assisted drive mode ADAS is maintained until an interaction request of the driver 1000 is received (step S6). The interaction request either requests resuming the assisted drive mode AS (RESUME in FIG. 3) or requests transitioning to a manual drive mode (DEACTIVATE in FIG. 3). In case of resuming the assisted drive mode AS, the method 400 returns to step S1. In case of transitioning to a manual drive mode, the method proceeds to step S7, in which deactivating the safe assisted drive mode ADAS automatically introduces the manual drive mode in which the vehicle 100, in particular the drive control system 200 does no longer provide any support to the driver 1000, but still provides basic safety functionalities. Examples of basic safety functionalities include emergency braking, anti-lock braking system (ABS), electronic stability control (ESC), and the like.

Figure 5:
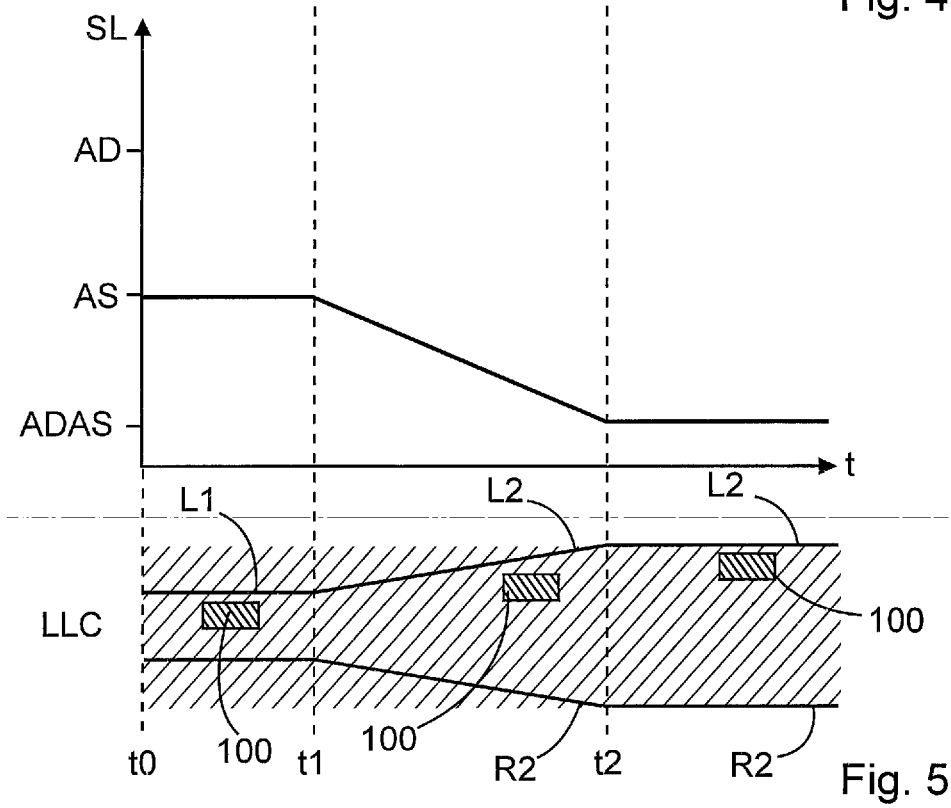
FIG. 5 shows a diagram, schematically illustrating the process of transitioning a drive mode of a vehicle from assisted drive mode to an automated drive mode, in case the activation request for activating the automated drive mode being not successful, over time as well as the corresponding changes in the support level by the example of lateral lane control.

FIGS. 4 and 5 show diagrams schematically illustrating changing of the support level SL for transitioning a drive mode of a vehicle from assisted drive mode AS to an automated drive mode AD over time as well as the corresponding changes in the support level by the example of lateral lane control LLC. FIG. 4 shows the case in which the activation request for activating the automated drive mode is successful, and FIG. 5 shows the case in which the activation request for activating the automated drive mode is not successful.

In FIGS. 4 and 5, the vehicle 100 starts in the assisted drive mode AS (time t0). The assisted drive mode AS provides a medium support level to the driver 1000, illustrated by the lateral lane control LLC having first in-lane target area boundaries L1, R1. The assisted drive mode AS is maintained until an activation request for activating the automated drive mode AD is received (time t1). The interval from t1 to t2, the interval may preferably be between 300 ms and 3 s, more preferably between 300 ms and 1.5 s or between 300 ms and 700 ms, describes the transitioning from the assisted drive mode AS to the safe assisted drive mode ADAS. The transitioning includes a slackening of the lateral lane control LLC by widening the in-lane target area boundaries L1, R1, as well as a fade-out of the propulsive (longitudinal) control. At time t2, the lateral lane control keeps the vehicle 100 in between the second in-lane area boundaries L2, R2.

In FIG. 4, at time t2, the activation request is successful and the automated drive mode AD is activated. From the time t2 to the time t3 describes the transitioning from the safe assisted drive mode ADAS to the automated drive mode AD, also called ramp-up of the automated drive mode AD. During this ramp-up, the in-lane target area boundaries of the lateral lane control LLC are tightly sharpened and at the time t3, the third in-lane target area boundaries L3, R3 are narrower than during the assisted drive mode AS at the beginning and the automated drive mode AD is fully active.

In FIG. 5, at the time t2, the activation request for activating the automated drive mode AD fails and thus, the automated drive mode AD is not activated. After the activation request failed, the safe assisted drive mode ADAS is maintained beyond the time t2 and the second in-lane target area boundaries L2, R2 of the lateral lane control LLC are maintained.

Although, only kinematic feedbacks are described, further embodiments may additionally include further feedbacks, e.g. colored light sources or icons in a driver's instrument panel and/or on the steering wheel, sound warnings, and/or haptic warnings in the form of vibrations.

The invention claimed is:

1. A method for transitioning a drive mode of a vehicle from an assisted drive mode (AS) to an automated drive mode (AD), the method comprising:
   providing an assisted drive mode (AS) configured to support a driver controlling the vehicle at a medium support level defined as a partly automated support level;
   receiving an activation request for activating an automated drive mode (AD) configured to control a driving of the vehicle autonomously at a high support level defined as a fully automated support level;
   first, in response to the activation request for activating the automated drive mode (AD) from the assisted drive mode (AS), reducing a support level (SL) to a safe assisted drive mode (ADAS) configured to support the driver at a low support level defined as a support level configured to only provide assistance in order to prevent a collision, the reduction of the support level (SL) from the assisted drive mode (AS) to the safe assisted drive mode (ADAS) comprising a first kinematic feedback; and
   in response to the activation request for activating the automated drive mode (AD) from the assisted drive mode (AS) and subsequent to reducing the support level (SL) from the assisted drive mode (AS) to the safe assisted drive mode (ADAS) in response to the activation request,
      if the activation request is successful, increasing the support level (SL) directly from the safe assisted drive mode (ADAS) to the automated drive mode (AD), the increase of the support level (SL) from the safe assisted drive mode (ADAS) to the automated drive mode (AD) comprising a second kinematic feedback to the driver, or
      if the activation request fails, maintaining the safe assisted drive mode (ADAS).

2. The method according to claim 1, the medium support level comprising a longitudinal control and a lateral control.

3. The method according to claim 2, wherein the longitudinal control and the lateral control are provided by an activated lane centering assist and an activated adaptive cruise control.

4. The method according to claim 1, the low support level comprising a longitudinal braking assistance and active safety functionalities.

5. The method according to claim 4, wherein the longitudinal braking assistance and the active safety functionalities are provided by an activated lane keeping assist and an activated collision prevention assist.

6. The method according to claim 1, the first and the second kinematic feedback being based on a main driving control.

7. The method according to claim 6, the first kinematic feedback being characterized by a slackening of the main driving control.

8. The method according to claim 6, the second kinematic feedback being characterized by a sharpening of the main driving control.

9. The method according to claim 6, the main driving control comprising one or more of an accelerator pedal, a brake pedal and a steering wheel.

10. The method according to claim 1, further comprising providing one or more of an acoustic feedback, a visual feedback, and a haptic feedback configured to indicate an activated drive mode.

11. The method according to claim 1, the safe assisted drive mode (ADAS) being maintained for a predefined amount of time or until receiving an interaction request of the driver.

12. The method according to claim 11, the interaction request of the driver requesting resuming the assisted drive mode (AS) or requesting transitioning to a manual drive mode configured to not assist the driver, but to provide basic safety functionalities including at least one of emergency braking, anti-lock braking, or electronic stability control.

13. A drive control system for a vehicle, the drive control system comprising:
   a control unit comprising a computer configured to:
      provide an assisted drive mode (AS) configured to support a driver controlling the vehicle at a medium support level defined as a partly automated support level;
      receive an activation request for activating an automated drive mode (AD) configured to control a driving of the vehicle autonomously at a high support level defined as a fully automated support level;

first, in response to the activation request for activating the automated drive mode (AD) from the assisted drive mode (AS), reduce a support level (SL) to a safe assisted drive mode (ADAS) configured to support the driver at a low support level low support level defined as a support level configured to only provide assistance in order to prevent a collision; and in response to the activation request for activating the automated drive mode (AD) from the assisted drive mode (AS) and subsequent to reducing the support level (SL) from the assisted drive mode (AS) to the safe assisted drive mode (ADAS) in response to the activation request,
if the activation request is successful, increase the support level (SL) directly from the safe assisted drive mode (ADAS) to an automated drive mode (AD), or
if the activation request fails, maintain the safe assisted drive mode (ADAS); and a feedback unit comprising at least one main driving control configured to provide one or more of a first kinematic feedback comprising a slackening of the at least one main driving control to the driver when reducing the support level (SL) from the assisted drive mode (AS) to the safe assisted drive mode (ADAS) and to provide a second kinematic feedback comprising a stiffening of the at least one main driving control to the driver when increasing the support level (SL) from the safe assisted drive mode (ADAS) to the automated drive mode (AD).

14. The drive control system according to claim 13, the control unit further comprising a manual drive mode configured to not assist the driver, but to provide basic safety functionalities including at least one of emergency braking, anti-lock braking, or electronic stability control.

15. The drive control system according to claim 13, further comprising a human-machine interface configured to provide one or more of an acoustic feedback, a visual feedback, and a haptic feedback indicating an activated drive mode.

16. The drive control system according to claim 13, the first and the second kinematic feedback being based on the main driving control comprising a steering wheel.

17. A vehicle, comprising:
a drive control system, comprising:
a control unit comprising a computer configured to:
provide an assisted drive mode (AS) configured to support a driver controlling the vehicle at a medium support level defined as a partly automated support level;
receive an activation request for activating an automated drive mode (AD) configured to control a driving of the vehicle autonomously at a high support level defined as a fully automated support level;
first, in response to the activation request for activating the automated drive mode (AD) from the assisted drive mode (AS), reduce a support level (SL) to a safe assisted drive mode (ADAS) configured to support the driver at a low support level defined as a support level configured to only provide assistance in order to prevent a collision; and
in response to the activation request for activating the automated drive mode (AD) from the assisted drive mode (AS) and subsequent to reducing the support level (SL) from the assisted drive mode (AS) to the safe assisted drive mode (ADAS) in response to the activation request,
if the activation request is successful, increase the support level (SL) directly from the safe assisted drive mode (ADAS) to an automated drive mode (AD), or
if the activation request fails, maintain the safe assisted drive mode (ADAS); and
a feedback unit comprising at least one main driving control configured to provide one or more of a first kinematic feedback comprising a slackening of the at least one main driving control to the driver when reducing the support level (SL) from the assisted drive mode (AS) to the safe assisted drive mode (ADAS) and to provide a second kinematic feedback comprising a stiffening of the at least one main driving control to the driver when increasing the support level (SL) from the safe assisted drive mode (ADAS) to the automated drive mode (AD); and
a drive unit comprising a plurality of main driving controls including the at least one main driving control and configured to control a motion of the vehicle, wherein the drive control system is configured to control the drive unit.

18. The vehicle according to claim 17, the control unit further comprising a manual drive mode configured to not assist the driver, but to provide basic safety functionalities including at least one of emergency braking, anti-lock braking, or electronic stability control.

19. The vehicle according to claim 17, wherein the drive control system further comprises a human-machine interface configured to provide one or more of an acoustic feedback, a visual feedback, and a haptic feedback indicating the activated drive mode.

20. The vehicle according to claim 17, the first and the second kinematic feedback being based on the main driving control comprising a steering wheel.

* * * * *